United States Patent
Yama et al.

(10) Patent No.: US 10,999,421 B1
(45) Date of Patent: May 4, 2021

(54) SYSTEM AND METHOD FOR UTILIZING PRESSURE SENSORS IN AN ELECTRIC DEVICE

(71) Applicant: Robert Bosch GmbH, Stuttgart (DE)

(72) Inventors: Gary Yama, Mountain View, CA (US); Christian Peters, Mountain View, CA (US); Thomas Rocznik, Mountain View, CA (US); Timothy Schultz, Sunnyvale, CA (US); Ning Wang, Sunnyvale, CA (US); Seow Yuen Yee, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/718,012

(22) Filed: Dec. 17, 2019

(51) Int. Cl.
 *H04M 1/724* (2021.01)

(52) U.S. Cl.
 CPC ........ *H04M 1/724* (2021.01); *H04M 2250/12* (2013.01)

(58) Field of Classification Search
 CPC ..... G06F 3/03–0448; G06F 2203/0339; G06F 2203/04101; H04M 1/724; H04M 2250/12
 See application file for complete search history.

(56) References Cited

U.S. PATENT DOCUMENTS

| | | | |
|---|---|---|---|
| 7,499,040 B2 | 3/2009 | Zadesky et al. | |
| 7,554,167 B2 | 6/2009 | Vaganov | |
| 9,203,951 B1 | 12/2015 | Kritt et al. | |
| 9,411,511 B1 | 8/2016 | Sivertsen | |
| 9,762,236 B2 | 9/2017 | Chen et al. | |
| 2004/0159535 A1 | 8/2004 | Wagner | |
| 2005/0052425 A1 | 3/2005 | Zadesky et al. | |
| 2005/0190152 A1 | 9/2005 | Vaganov | |
| 2006/0197750 A1 | 9/2006 | Kerr et al. | |
| 2010/0085325 A1 | 4/2010 | King-Smith et al. | |
| 2010/0141410 A1 | 6/2010 | Aono et al. | |
| 2010/0156245 A1 | 6/2010 | Barta et al. | |

(Continued)

FOREIGN PATENT DOCUMENTS

| | | |
|---|---|---|
| CN | 206039370 U | 3/2017 |
| CN | 106919292 A | 7/2017 |

(Continued)

*Primary Examiner* — Raymond S Dean
(74) *Attorney, Agent, or Firm* — Brooks Kushman P.C.

(57) ABSTRACT

A system of determining a location of a force exerted on a mobile communication device, the system comprising a first pressure sensor disposed within the mobile communication device and adjacent an outer surface of the mobile communication device, wherein the first pressure sensor is attached to the outer surface via a first interface material, wherein the first pressure sensor is configured to detect pressure below the outer surface, a second pressure sensor disposed within the mobile communication device and adjacent the outer surface of the mobile communication device, wherein the second pressure sensor is attached to the outer surface via a second interface material, wherein the second pressure sensor is configured to detect pressure below the outer surface, and a processor coupled to the first and second pressure sensors and configured to activate an associated mobile communication device command in response to the detected pressure being above a threshold.

17 Claims, 2 Drawing Sheets

(56) References Cited

U.S. PATENT DOCUMENTS

| | | | |
|---|---|---|---|
| 2011/0007023 A1* | 1/2011 | Abrahamsson | G06F 3/0416 345/174 |
| 2011/0167391 A1* | 7/2011 | Momeyer | G06F 3/038 715/863 |
| 2012/0032905 A1 | 2/2012 | Koshiyama et al. | |
| 2012/0319503 A1* | 12/2012 | Johnson | H04N 5/4403 307/119 |
| 2013/0154948 A1 | 6/2013 | Schediwy et al. | |
| 2014/0028602 A1 | 1/2014 | Morinaga et al. | |
| 2014/0028604 A1 | 1/2014 | Morinaga et al. | |
| 2014/0160641 A1 | 6/2014 | Chuang et al. | |
| 2014/0230575 A1 | 8/2014 | Picciotto et al. | |
| 2014/0334077 A1 | 11/2014 | Kwong | |
| 2015/0002450 A1 | 1/2015 | Lewis et al. | |
| 2015/0123889 A1 | 5/2015 | Willis et al. | |
| 2015/0138106 A1 | 5/2015 | Nishimiya et al. | |
| 2015/0145805 A1 | 5/2015 | Liu | |
| 2015/0160770 A1 | 6/2015 | Stewart et al. | |
| 2015/0169100 A1 | 6/2015 | Tsuyuki et al. | |
| 2016/0048668 A1 | 2/2016 | Zafiris | |
| 2016/0179276 A1 | 6/2016 | Nathan et al. | |
| 2016/0188006 A1 | 6/2016 | Han et al. | |
| 2016/0196421 A1 | 7/2016 | Kitada et al. | |
| 2016/0225568 A1 | 8/2016 | Chen et al. | |
| 2016/0238433 A1 | 8/2016 | Kuo et al. | |
| 2016/0246396 A1 | 8/2016 | Dickinson et al. | |
| 2016/0246413 A1 | 8/2016 | Kano et al. | |
| 2016/0259458 A1 | 9/2016 | Johansson et al. | |
| 2016/0276861 A1* | 9/2016 | Tages | H02J 50/12 |
| 2016/0283035 A1 | 9/2016 | Sandblad et al. | |
| 2016/0328079 A1 | 11/2016 | Schwartz et al. | |
| 2016/0358737 A1 | 12/2016 | Brooks et al. | |
| 2017/0038877 A1 | 2/2017 | Kuboyama et al. | |
| 2017/0177152 A1 | 6/2017 | Sato et al. | |
| 2017/0199624 A1 | 7/2017 | Nathan et al. | |
| 2017/0235398 A1 | 8/2017 | Choi et al. | |
| 2017/0280027 A1* | 9/2017 | Wang | H04N 5/2253 |
| 2017/0280393 A1 | 9/2017 | Suo | |
| 2017/0316243 A1 | 11/2017 | Ghavanini | |
| 2017/0336970 A1 | 11/2017 | Kim et al. | |
| 2018/0059871 A1 | 3/2018 | Fukushima | |
| 2018/0074636 A1 | 3/2018 | Lee et al. | |
| 2018/0129355 A1 | 5/2018 | Lynn et al. | |
| 2018/0136770 A1 | 5/2018 | Kwong et al. | |
| 2018/0136776 A1 | 5/2018 | Xie | |
| 2018/0164937 A1 | 6/2018 | Lynn et al. | |
| 2018/0181260 A1 | 6/2018 | Kikuchi | |
| 2018/0246612 A1 | 8/2018 | Lynn et al. | |
| 2018/0292938 A1 | 10/2018 | Karlo et al. | |
| 2018/0299996 A1 | 10/2018 | Kugler et al. | |
| 2018/0300004 A1* | 10/2018 | Kugler | G06F 3/0414 |
| 2018/0307339 A1 | 10/2018 | Ho et al. | |

FOREIGN PATENT DOCUMENTS

| | | |
|---|---|---|
| EP | 2685358 A1 | 1/2014 |
| KR | 20130106503 A | 9/2013 |
| KR | 20130106956 A | 10/2013 |
| WO | 2018016906 A1 | 1/2018 |
| WO | 2018080115 A1 | 5/2018 |

* cited by examiner

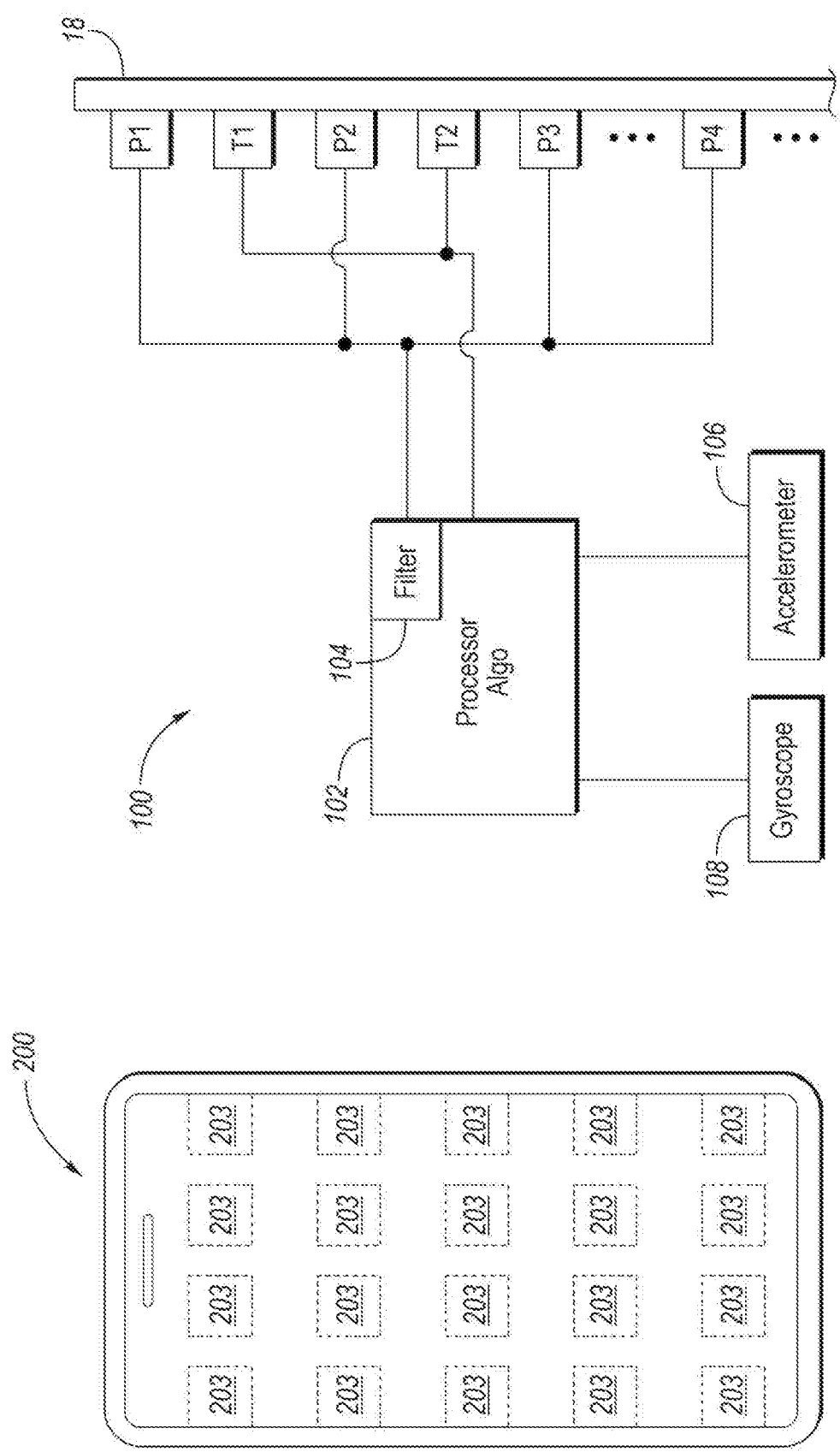

SYSTEM AND METHOD FOR UTILIZING PRESSURE SENSORS IN AN ELECTRIC DEVICE

TECHNICAL FIELD

The present disclosure relates to push buttons and touch buttons on electronic devices such as smartphones.

BACKGROUND

Today's smartphones have typically three push buttons on the outside wall of the frame to switch the phone on and off as well as to control the audio volume. These buttons have several drawbacks, such as design limitations due to the mechanical presence of the buttons, milling and/or drilling of the phone frame is required which is a cost factor for OEMs, reduced water resistance of the phone, as well as dust.

SUMMARY

According to a one embodiment, a system of determining a location of a force exerted on a mobile communication device, the system comprising a first pressure sensor disposed within the mobile communication device and adjacent an outer surface of the mobile communication device, wherein the first pressure sensor is attached to the outer surface via a first interface material, wherein the first pressure sensor is configured to detect pressure below the outer surface, a second pressure sensor disposed within the mobile communication device and adjacent the outer surface of the mobile communication device, wherein the second pressure sensor is attached to the outer surface via a second interface material, wherein the second pressure sensor is configured to detect pressure below the outer surface, and a processor coupled to the first and second pressure sensors and configured to activate an associated mobile communication device command in response to the detected pressure being above a threshold.

According to a second embodiment, a mobile communication device includes a frame, one or more areas of interface material adjacent the frame, first and second pressure sensors disposed along the frame at the one or more areas of interface material wherein the first and second pressure sensors are configured to detect pressure in the areas of interface material, and a processor in communication with the first and second pressure sensors and programmed to determine (i) an external force exerted on the frame based on the first pressure sensor detecting an increase in pressure that exceeds a pressure threshold and (ii) activate a command in response to the increase in pressure.

According to a third embodiment, a system of determining a location of a force exerted on a mobile communication device, the system comprising a first pressure sensor disposed within the mobile communication device and adjacent an outer surface of the mobile communication device and configured to detect pressure below the outer surface, an interface material attached to the outer surface and the first pressure sensor, and a processor coupled to the first pressure sensors and programmed to activate a signal in response to the detected pressure being above a threshold pressure.

BRIEF DESCRIPTION OF THE DRAWINGS

FIG. 3 illustrates an example of a mobile device 200 that includes pressure sensors arranged in a matrix array on a surface.

FIG. 4 illustrates a schematic of a control system according to one embodiment.

DETAILED DESCRIPTION

Figure 1:
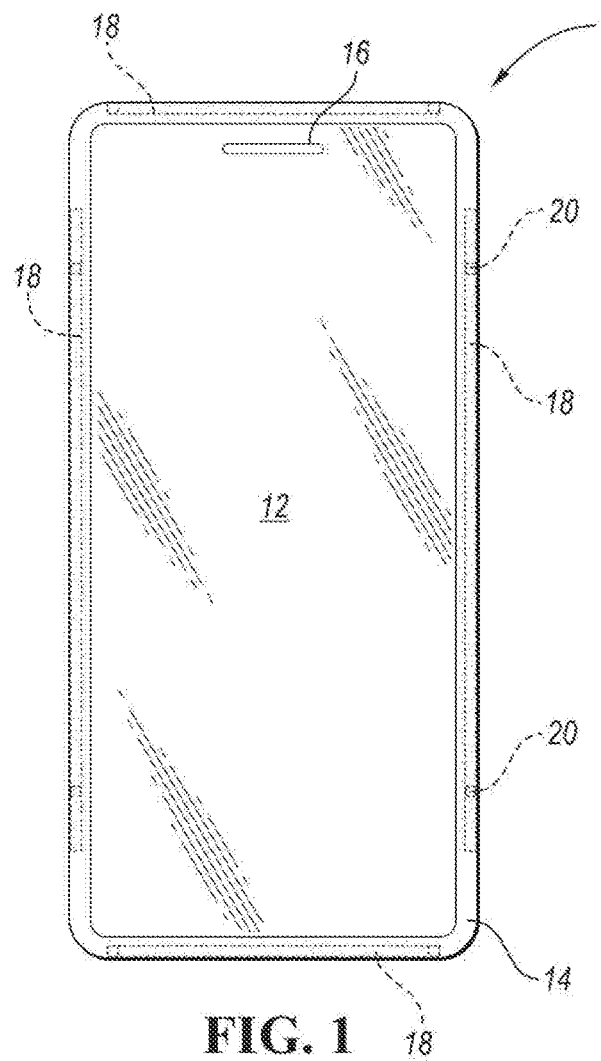
FIG. 1 is a top plan view of a mobile communication device configured to detect a force exerted on a surface thereof via a pressure sensor according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In this disclosure, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause the controller to increase or decrease volume controls of a mobile communication device, or turn on or off a viewing screen of the mobile communication device that are typically commanded in response to a depression of a physical button residing on the edge of a frame of the mobile communication device.

This disclosure also makes reference to mobile communication devices. It is intended that the term "mobile communication device," or similar phrases such as "mobile device," shall include personal communication devices such as smart phones, cellular phones, tablets, pagers, wearable devices such as smart watches, and other such devices having wireless network connectivity. Furthermore, the term "interface material" or another similar phrase shall be intended to include, in certain circumstances, gel, fluid medium, interface layer, interface medium, transfer medium, etc.

Mobile communication devices such as smartphones or tablets typically have three push buttons on an outside wall of a frame of the mobile communication device—one button to turn the device (or its screen) on and off, another button to increase the audio volume, and another button to decrease the audio volume. Other such buttons are also common, such as a toggle switch that turns a vibrate function on and off. These buttons have several drawbacks. For instance, these buttons have design limitations due to the mechanical presence of the buttons. The buttons might be constrained to be in a particular location or of a particular size due to the packaging space necessary for such a button. Also, milling and/or drilling of the frame of the phone is typically required to create an opening for the push button. This process can be a substantial cost factor for mobile communication device manufactures. Moreover, the holes made in the frame for the button reduces the water resistance and increases the likelihood of dust collection within the mobile communication device.

This disclosure relates to a technology to replace push buttons on electronic devices, such as a mobile device like a smartphone. At a high-level, the mobile phone or other electronic device may utilize an array of pressure sensors attached to the interior of the frame. The interface material, in between the frame and sensor, will transfer the pressure exerted on the frame to the pressure sensor. This process may provide an indication of where the user is pressing on the frame and in turn activate a command in response to the pressure sensor identifying the exerted force.

The pressure sensor may be configured to detect a change in deflection of the electronic device frame or identify an exerted force when the user grips and squeezes the frame while holding. The pressure sensor may include a transfer medium, such as an interface material or a gel, located between the inside of the frame and the pressure sensor. An array of pressure sensors along the side may be allowed to provide an indication of where the user is gripping along the side. Signals from the pressure sensors may be connected to an electronic processing unit to indicate which virtual button the user may be pressing or activating along the mobile phone.

In one embodiment, the mobile communication device may use a single or an array of pressure sensors mounted to the inside of the frame. Pressure sensors may be attached to a rigid sheet, which can be printed circuit board or other material. An interface material, such as a polymer gel or other similar material, may be used to couple the pressure sensor or array to the frame in such a way that the pressure exerted on the frame is transferred to the pressure sensor membrane. In order to replace one button of a phone, only one pressure sensor may be needed.

Referring to FIG. 1, a mobile communication device 10 is illustrated. The mobile communication device 10 has a front surface 12, and an opposing rear surface. The front surface 12 can be a touch screen configured for viewing information thereon while also enabling a user to select items on the screen such as applications ("apps") and the like. The front surface 12 may be made of glass or any other material that is utilized for a touch panel or similar screen. The mobile communication device 10 also includes a frame 14. The frame 14 can be metal (e.g., aluminum, titanium, etc.) that creates a "skeleton" of the mobile communication device 10. In another embodiment, the frame may be a plastic material or any other type of similar material. The frame 14 may also include the outer surface of the mobile communication device 10, or can be internal to the outer surface of the mobile communication device 10. One or more apertures 16 may be provided in the frame 14. The apertures 16 may be located at various locations and be provided for speakers, power connections, headphone connections, and the like.

The pressure sensors 20 can be any type of sensor which can measure a pressure and/or pressure change with a sufficient resolution and sample frequency. For example, the pressure sensors 20 can be a BMP388 by BOSCH SENSORTEC. In another embodiment, the pressure sensors 20 can be a BMP280 by BOSCH SENSORTEC. If a user applies a force to the outside surface of the mobile communication device 10 where the interface material is located, that interface material 18 will deform and a pressure wave will be sent out within the fluid medium from where the force is applied. The one or more pressure sensors 20 are configured to detect the pressure or change in pressure in the interface material resulting from the applied force on the outside surface of the mobile communication device 10. An associated controller can be coupled to the one or more pressure sensors 20 and can command an action in response to the detected force application.

The interface material 18 may be located at each location where the pressure sensor 20 is located. Thus, in between the pressure sensors 20, there may not be interface material and simply the frame 14 in one embodiment. In another embodiment, the interface material 18 may be located along one or more edges of the frame 14 of the mobile communication device 10. For example, an interface material 18 may be located along the top (e.g., above aperture 16), one along the bottom edge, one along the left edge, and another along the right edge. In another embodiment, only interface material 18 is provided along only a single edge of the frame 14.

In one embodiment, one or more of the pressure sensors 20 are provided for each interface material 18, and are used to detect an event and trigger a command. For example, the controller can be configured to increase the volume if the pressure sensor(s) 20 adjacent the interface material 18 on the right edge is depressed, and configured to decrease the volume if the pressure sensor(s) 20 adjacent the interface material 18 on the left edge is depressed. One pressure sensor 20 per interface material region may be the appropriate amount of pressure sensors for such an embodiment. Another example would be when the edge is depressed, an application, such as camera, messaging, phone dialing or other function will be activated. A sequence of squeezing and/or strength of force will give the mobile device indication of which application is desired to be activated.

Figure 2:
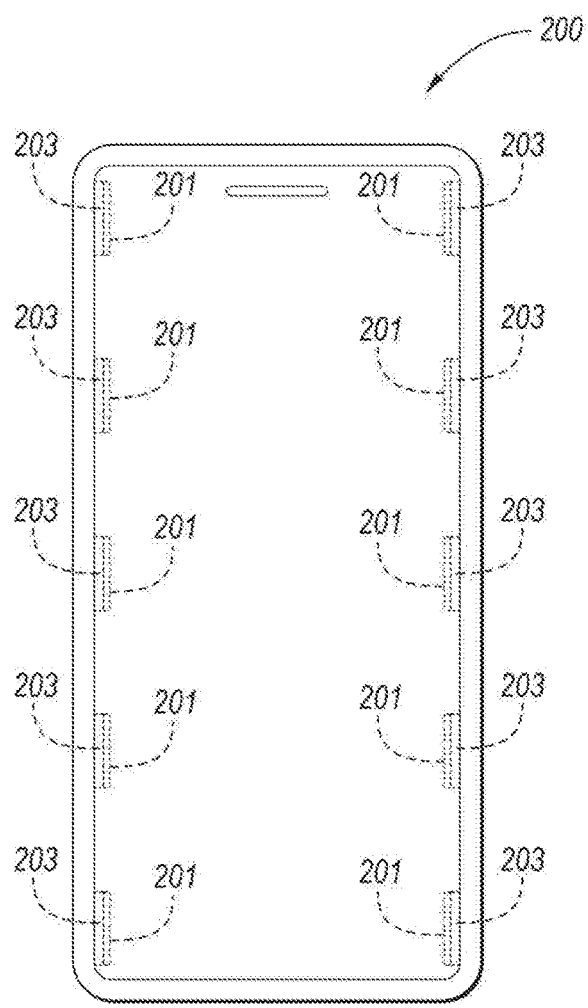
FIG. 2 discloses a mobile device 200 that utilizes pressure sensors and an interface material located on a frame of a mobile communication device

FIG. 2 discloses a mobile device 200 that utilizes pressure sensors and an interface material located on a frame of a mobile communication device. In such an embodiment, pressure sensors 203 may be attached to the inside of the frame 202 of the mobile phone 200 utilizing a gel 201. The pressure sensors 203 that are attached to the inside of the frame may be used to replace physical buttons for functions such as on/off, volume up/down, mute on/off, etc. In an alternative embodiment, the pressure sensors 203 may be attached to a touch panel, back side or other frame to allow for replacement of touch panels and have increased functionality of the back side, such as back side scrolling or other.

The gel or interface material may be in direct contact to the pressure sensing surface of the pressure sensor 203. It one embodiment, a gap will not exist between the pressure sensor 203 and the gel 201. Any kind of gap, like an air gap, will strongly decrease the signal derived from the exerted force on the frame adjacent the pressure sensor 203, therefore a minimally compressible interface material is desirable. It might be necessary for the protective caps of the pressure sensor to be removed in the circumstance when the pressure sensor includes a protective cap. The gel can be any type that is stable against time and environmental influences, including silicone gel, Polydimethylsiloxane (PDMS), or another similar substance. Furthermore, the gel may be required to retain its shape over time, for example, and not melt away at higher temperatures or freeze at lower temperatures. The gel or another fluid may be within a tube that includes the pressure sensors. An example of this may be included in patent application titled "PRESSURE CHAMBER AND ASSOCIATED PRESSURE SENSORS FOR A MOBILE COMMUNICATION DEVICE", Ser. No. 16/717,992, filed on the same day as this application, which is hereby incorporated by reference in its entirety. Additionally, the pressure sensor array can also be arranged in a matrix configuration for sensing pressure applied to the backside or front side of the case, as discussed below with respect to FIG. 3. The pressure sensors may be any type of pressure sensor, such as an off the shelf pressure sensor such as a BMP280 sourced from Bosch Sensortec or other pressure sensing device. Thus, no new sensors need to have to be developed and such off-the-shelf sensors are relatively cheap.

The pressure sensor maybe be mounted rigidly along the frame of the mobile device in order to provide good sensitivity utilizing the adhesive gel. If the pressure sensor is not mounted in such a manner (e.g., the phone case backside), it may move when pressure is applied and the signal may not very strong or be reduced. Metal mounting plates may be used to avoid any kind of movement of the sensor. Or, in another embodiment, pressure sensors may be attached to a rigid sheet, which can be printed circuit board or other material. In one embodiment, the interface layer can be a single material that is both a pressure transfer medium and adhesive. If this is not the case, in a separate embodiment, there may be separate adhesive layers between the transfer medium and frame, and between transfer medium and sensor. Or, if not, there may be another mechanical mechanism that holds the sensor in such a manner that it cannot move with respect to the transfer medium and the frame. The mobile device may also include a mechanical stop to prevent extreme over-pressure (e.g., a large force) from damaging the pressure sensing membrane. This can be an anti-compressible material or piece, for example metal or ceramic, that is mounted in between the frame of the device and the rigid board that the pressure sensor is mounted to. This will limit the amount of force transferred to the pressure sensor.

FIG. 3 illustrates an example of a mobile device 200 that includes pressure sensors arranged in a matrix array on a surface. As such, the pressure sensor array can also be arranged in a matrix configuration for sensing pressure applied to the backside or front side of the case. For example, the pressure sensors 203 may be located along a back side (via the interface material) of a touch panel (e.g., glass panel or any other type of surface) located on a front surface of the mobile device 200. In another theory, the pressure sensors 203 may be located along a back surface of the mobile device 200. Thus, the pressure sensors do not need to be only aligned along a frame of the sides of the mobile device. In such an arrangement, the pressure sensors may be utilized to activate traditional touch panel functions or to provide command activation on the back surface of the mobile device 200. Thus, such commands such as launching an application or adjust settings on the mobile device 200 may be initiated via the pressure sensors 203.

FIG. 4 illustrates a schematic of a control system 100 according to one embodiment. The control system 100 includes a controller described above, which may be or include a processor 102 configured to perform one or more algorithms for identifying an external force exerted on the frame 14 of the mobile communication device 10, or determining the location of the external force exerted on the frame 14 of the mobile communication device 10. The processor 102 may be the main processor for the mobile communication device 10, or another processor dedicated for force identification or location determination. The processor may be any type of processor or microprocessor, controller, digital signal processor, application processor, etc.

The system 100 may include various pressure sensors (P1, P2, . . . , PN) and various temperature sensors (T1, T2, . . . , TN) located along or in communication with an interface material 18 (e.g. adhesive gel material) or the frame 14. The pressure sensors output signals to the processor 102 that indicate the pressure (e.g., fluid pressure) exerted on the sensor itself. The pressure sensor signals may be filtered by filter 104 for removing noise or other distortion, etc. The filter 104 may be adjustable depending on the material of the frame 14 or an interface material 18, and other factors. In other embodiments, temperature sensors output signals to the processor 102 that indicate the temperature of the fluid, temperature of the mobile communication device 10, or interface material 19, frame 14, etc.

A temperature sensor can also be included to compensate for use in hot or cold environments. The temperature sensor may be integrated into the pressure sensor or a separate temperature sensor may be utilized. The temperature sensor may be located in the mobile device and can either measure the temperature of the environment proximate the mobile phone, the temperature of the gel, the temperature of the pressure sensor, etc. In response to the temperature that is determined by the temperature sensor, the processor in communication with the temperature sensor and pressure sensor may change the threshold of activation of a signal in response to force along the pressure sensor. For example, if the temperature of the environment (e.g., the mobile phone, the gel, the sensor, etc.) of the mobile phone is cold and the gel becomes denser and loses elasticity to move, the gel may require additional force to activate a command at the pressure sensor (based on the original pressure threshold). Instead, the processor may utilize the temperature sensor to derive a temperature reading and thus update the threshold in the event the sensor identifies a colder temperature (e.g., below a threshold temperature). Thus, the pressure threshold may be altered and compensated to require less pressure to activate a signal (e.g., volume up/down, mute on/off, power on/off, reset, etc.) in a colder environment than in a warm environment. On the other hand, if the temperature of the environment (e.g., the mobile phone, the gel, the sensor, etc.) of the mobile phone is warmer (e.g., exceeds a threshold temperature) and the gel becomes thinner and more elastic and thus more sensitive to movement and force, the gel may then require less force to activate a command at the pressure sensor (based on the original pressure threshold). Thus, a hotter temperature may make the pressure sensor more sensitive. In one embodiment, the processor may utilize the temperature reading from the temperature sensor to update the threshold if it senses a warmer temperature. Thus, the threshold may require more pressure to activate a signal (e.g., volume up/down, mute on/off, power on/off, reset, etc.) in a warmer environment than in a colder environment due to sensitivity. Thus, false activations may be prevented through use of the temperature sensor in a warmer environment.

The processor 102 is programmed or configured to detect a force event using data from the pressure sensors, as explained above. Based on an increase in the pressure indicating a tap or a touch-and-hold event, the processor 102 may identify a force event or a location of the force event. The force event may be determined based on the identified force event exceeding a threshold pressure. The location of the force can be determined based on the time difference between the pressure wave reaching a first pressure sensor and the pressure wave reaching a second pressure sensor, for example. The factory set activation threshold (e.g., default threshold) or auto calibrated activation threshold may be too low or too high for a specific user in one embodiment. A user accessible calibration utility application could be used on the mobile device to set a custom activation threshold. The utility application could list all applications with frame button inputs and allow customized activation thresholds for each application. The utility application could enable different activation thresholds for each sensor separately. In another embodiment, the temperature sensor described above may be used to reset the activation threshold calibration each time the phone is turned on from a full off state, or each time the sensing system goes from sleep state to idle or operation state.

In one embodiment, a force calibration function can be used to change the baseline (zero force) pressure reading with temperature, and to change the activation pressure threshold with temperature. In the one example $P=(F*f(T))/A$ where P is activation pressure, F is user applied force, A is area of pressure measurement device exposed to pressure transfer medium, and f(T) is an experimentally determined calibration function of temperature that is input into the controller firmware. The influence of environmental factors and need for recalibration can be reduced by adding a reference pressure sensor set proximal to the active pressure sensor. Environmental factors will impact both sensors similarly such that the pressure difference between the sensors can be used in the activation threshold decision algorithm. Additionally, a temperature change magnitude parameter can be set as a trigger for recalibration should the temperature change be great enough to cause a large change in relative pressures under the same force application by the user.

The processor can filter out or not classify force events even if the pressure in the interface material has increased. For example, a sudden movement of the phone may change the pressure at the frame 14 or at the interface material, without any touch occurring on the frame 14. The processor can remove these events based on programmed code, machine learning, etc. As such, the processor may be able to adjust (e.g., recalibrate) the pressure threshold to identify an event.

Additional movement sensors, such as an accelerometer 106 and/or a gyroscope 108 can also be coupled to the processor 102. These movement sensors can detect such a movement of the mobile communication device 10 that would indicate whether the mobile communication device 10 is in use, held upright, or rather laying on an underlying surface such as a table. If no movement is detected, the system 100 can enter a low power sleep state. Any kind of movement can be measured using the accelerometer and wake up the system 100, readying the pressure sensors 20 for detection of pressure changes at the frame 14 via the interface material (e.g., adhesive gel) 18. Any additional movement during operation can be detected and motion artifacts can be removed from the pressure sensor signals. In order for the force to be recognized, an accelerometer can be used as a wake-up function when the device goes from a non-moving state to a moving state, such as when a user picks up or grips the device. This may allow for power savings, so the mobile communication device is not on all the time. The accelerometer can be part of the pressure sensor 203 or a separate accelerometer which is already part of the electronic device can be accessed via software (e.g., an application). A separate accelerometer can also be used for a wake-up function so that the device does not have to be powered up all the time, thus saving battery life. Thus, the pressure sensor may not constantly be reading pressure signals at the frame and gel when the accelerometer data indicates that the mobile device is not "woken up."

A reset or calibration feature may also be incorporated into the processor 102 software. The reset or calibration feature may be used to set a users desired force to activate the device. The force transfer medium can change its properties when using in hot or cold environments. A calibration function can be used for resetting the force transfer during an operation of turning on or off the device. In addition, a reference pressure sensor can be used in order to build a semi differential sensor system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system of determining a location of a force exerted on a mobile communication device, the system comprising:
   a first pressure sensor disposed within the mobile communication device and adjacent an outer surface of the mobile communication device, wherein the first pressure sensor is attached to the outer surface via a first interface material located between a frame of the mobile communication device and the first sensor, wherein the first pressure sensor is configured to detect pressure below the outer surface, wherein the pressure is associated with a function of temperature;
   a second pressure sensor disposed within the mobile communication device and adjacent the outer surface of the mobile communication device, wherein the second pressure sensor is attached to the outer surface via a second interface material, wherein the second pressure sensor is configured to detect pressure below the outer surface, wherein the first and second pressure sensor are configured detect a change in pressure in response to a pressure wave applied to either the first interface material or the second interface material; and
   a processor coupled to the first and second pressure sensors and configured to activate an associated mobile communication device command in response to the detected pressure being above a threshold and a location of where the user is pressing on the frame; and
   a temperature sensor configured to determine a temperature of the interface material, wherein the processor is further configured to, in response to the temperature of the interface material, compensate the threshold.

2. The system of claim 1, wherein the associated mobile communication device command includes powering the mobile communication device, adjusting volume of the mobile communication device, or turning a screen of the mobile communication device on or off.

3. The system of claim 1, wherein the processor is configured to activate a first associated mobile communication device command in response to a first detected pressure of the first pressure sensor being above the threshold.

4. The system of claim 1, wherein the processor is configured to activate a second associated mobile communication device command in response to a second detected pressure of the second pressure sensor being above the threshold.

5. The system of claim 1, wherein the first interface material and second interface material are a same material.

6. The system of claim 1, wherein the first interface material and second interface material are polymer or adhesive gel.

7. A mobile communication device comprising:
   a frame;
   one or more areas of interface material adjacent the frame;
   first and second pressure sensors disposed along the frame at the one or more areas of interface material wherein the first and second pressure sensors are configured to detect a change in pressure or pressure in the areas of interface material, wherein the pressure is associated with a function of temperature;
   a temperature sensor configured to determine a temperature of the one or more areas of interface material;
   a processor in communication with the first and second pressure sensors and programmed to (i) determine an external force exerted on the frame based on the first pressure sensor detecting an increase in pressure that exceeds a pressure threshold, (ii) activate a command in response to the increase in pressure, and (iii) in response to the temperature of the interface material, compensate the threshold.

8. The mobile communication device of claim 7, wherein the mobile communication device does not include physical buttons thereon.

9. The mobile communication device of claim 7, wherein the one or more areas of interface material is between the frame and the first pressure sensor or second pressure sensor.

10. The mobile communication device of claim 7, wherein the mobile communication device includes an accelerometer configured to initiate a wake-up function configured to power down the mobile communication device when not in use and power the mobile communication device in use.

11. A system of determining a location of a force exerted on a mobile communication device, the system comprising:
    a first pressure sensor disposed within the mobile communication device and adjacent an outer surface of the mobile communication device and configured to detect pressure below the outer surface, wherein the pressure is associated with a function of temperature;
    a temperature sensor configured to determine a temperature of the interface material;
    an interface material attached to the outer surface and the first pressure sensor; and
    a processor coupled to the first pressure sensors and programmed to activate a signal in response to the detected pressure being above a threshold pressure, wherein the processor is in communication with the temperature sensor and further programmed to, in response to the temperature of the interface material, compensate the threshold.

12. The system of claim 11, wherein the outer surface includes a frame of the mobile communication device.

13. The system of claim 11, wherein the system includes an accelerometer configured initiate a wake-up function of the mobile communication device.

14. The system of claim 11, wherein the interface material is a polymer gel or silicone gel.

15. The system of claim 11, wherein the system includes a mechanical stop located between the outer surface of the mobile communication device and a membrane of the first pressure sensor, wherein the mechanical stop includes an anti-compressible portion between the membrane and outer surface.

16. The system of claim 7, wherein the temperature sensor and the pressure sensor are an integrated sensor.

17. The system of claim 11, wherein the processor is further programmed to activate a trigger for recalibration in response to the temperature derived from the temperature sensor.

* * * * *